(12) United States Patent
Liu

(10) Patent No.: US 7,847,508 B2  
(45) Date of Patent: Dec. 7, 2010

(54) HEAT DISSIPATION SYSTEM

(75) Inventor: Jen-Yee Liu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 216 days.

(21) Appl. No.: 12/341,988

(22) Filed: Dec. 22, 2008

(65) Prior Publication Data

US 2009/0296343 A1 Dec. 3, 2009

(30) Foreign Application Priority Data

May 30, 2008 (CN) .......................... 2008 1 0301868

(51) Int. Cl.
*G05B 11/28* (2006.01)

(52) U.S. Cl. .................. 318/599; 318/268; 318/400.08; 318/722; 318/471

(58) Field of Classification Search .................. 318/599, 318/400.08, 708, 715, 721, 722, 268, 471, 318/472; 388/800, 804, 811, 815, 822, 827
See application file for complete search history.

(56) References Cited

U.S. PATENT DOCUMENTS

| | | | | |
|---|---|---|---|---|
| 4,879,591 A * | 11/1989 | Takei | ....................... | 348/224.1 |
| 5,744,927 A * | 4/1998 | Hayashida | .................. | 318/599 |
| 6,671,459 B1 * | 12/2003 | Bultman | ..................... | 388/804 |
| 6,779,981 B2 * | 8/2004 | Huang et al. | .................. | 417/42 |
| 7,323,836 B2 * | 1/2008 | Lin et al. | ..................... | 318/268 |
| 7,447,423 B2 * | 11/2008 | Chiu et al. | .................. | 388/822 |

* cited by examiner

*Primary Examiner*—Walter Benson  
*Assistant Examiner*—Thai Dinh  
(74) *Attorney, Agent, or Firm*—Zhigang Ma

(57) ABSTRACT

A heat dissipation system for an electronic device comprises a base, a fan, a pulse width modulation speed control circuit controlling the speed of the fan, a converter outputting a voltage signal, a selection switch connected to the motor, and a control element provided on the base, connected to the switch and to the converter. When the control element is operated, the switch selectively enables the motor be connected to the output of the pulse width modulation speed control circuit or to the output of the converter, and when the motor is electrically connected to the converter, the control element can modify the output voltage of the converter.

11 Claims, 2 Drawing Sheets

HEAT DISSIPATION SYSTEM

TECHNICAL FIELD OF THE DISCLOSURE

The disclosure is related to heat dissipation and, particularly, to a heat dissipation system used in an electronic device.

BACKGROUND OF THE DISCLOSURE

Speeds of fans used to dissipate heat in a system are often controlled by Pulse Width Modulation (PWM) circuits. Usually, a heat dissipation system includes a fan controlled by a rotation control unit, a speed control circuit receiving a PWM signal produced by a rotation control unit and converting the PWM signal to a voltage signal. A motor of the fan receives the voltage signal and then adjusts its speed based on the voltage signal. The voltage signal is in a proportional relationship to the speed of the motor.

In use, however, the described system provides no information regarding the temperature of the system, and speed of the fan cannot be adjusted based on the temperature or user intention. Accordingly, when the speed of the motor automatically increases, noise produced by the high speed is inevitable. Further, in unusual situations the PWM speed control circuit may fail to control the speed of the fan normally, with no user-based remedy available.

DETAILED DESCRIPTION OF THE EMBODIMENTS

Figure 2:
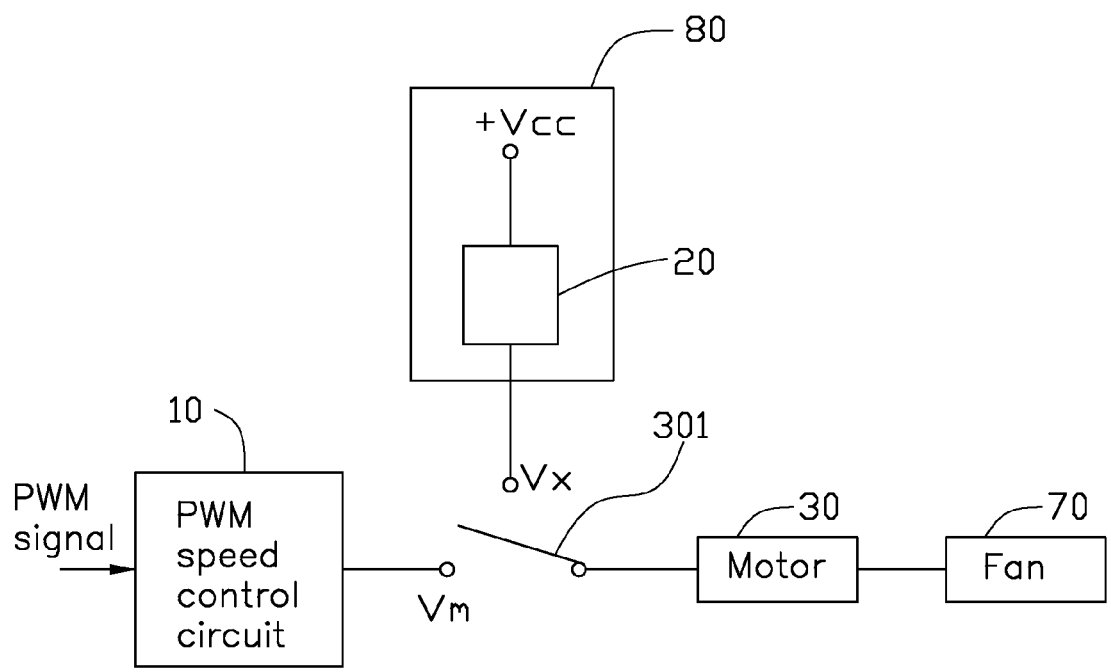
FIG. 2 is a schematic block diagram of a PWM speed control circuit of the disclosed heat dissipation system, together with a fan motor controlled thereby.

As shown in FIGS. 2 and 3, an exemplary heat dissipation system mounted in a computer case includes a PWM speed control circuit 10, a motor 30, a control element 40 for manual control, a speed control circuit 80, and a fan 70 connected to the motor.

The computer case includes a panel 50 defining an opening therein. The control element 40 is disposed in the opening. The control element 40 may retract into the opening or rebound to extend out of the opening when operated. The control element 40 can be a mixture of plastic and temperature sensitive color-changing material, and is injection molded. Alternatively, the control element 40 can be coated with a layer of temperature sensitive color-changing material. Accordingly, the color of the control 40 changes with temperature in the computer case, providing visual notification of the change. Distance between the notification elements, such as the control element 40, and the heat source may, in fact, generate some inaccuracy in the temperature indicated. Accordingly, when defining the colors of the control 40 corresponding to the temperature change, the inaccuracy should be compensated. Furthermore, for more uniform color change, the control element 40 can be made of material having higher heat conductivities.

The PWM speed control circuit 10 receives PWM signals from other device external to the heat dissipation system, converts the signals into a voltage signal Vm and outputs the converted signal.

The speed control circuit 80 includes a direct current power source Vcc and a converter 20 connected thereto. The converter 20 outputs a voltage signal Vx. A voltage regulator provided within the converter 20 normalizes the output voltage of the converter 20. The voltage regulator is connected to, and directed to operate by, the control element 40.

The fan is connected to and driven by a motor 30. The motor 30 includes a switch 301 connected to the control element 40. Operation of the control element 40 controls the switch 301 to connect to the converter 20, and the motor 30 receives the voltage signal Vx output by the speed control circuit 80. The speed of the motor 30 is in a proportional relationship to the voltage signal Vx. When the control element 40 controls the switch 301 to connect to the output of the PWM speed control circuit 10, the PWM speed control circuit 10 outputs a voltage signal Vm to the motor 30. The speed of the motor 30 is in a proportional relationship to the voltage value of the voltage signal Vm now.

When the heat dissipation system controls the speed of the motor 30 through the PWM speed control circuit 10, the speed of the fan is controlled automatically; and when the heat dissipation device is switched to manual speed control, wherein speed of the motor 30 is controlled by the speed control circuit 20, the control element 40 directly controls the speed of the motor 30 of the fan.

Figure 1:
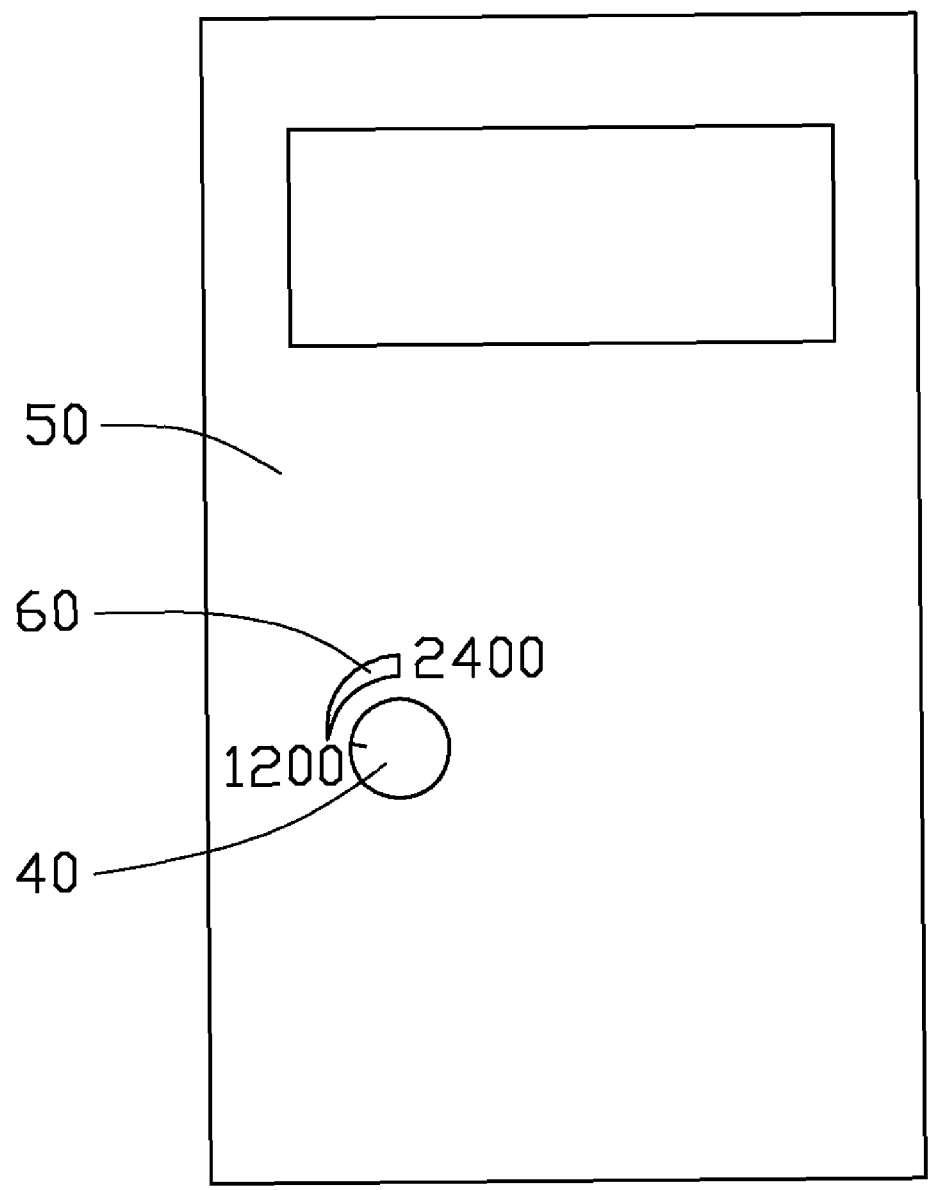
FIG. 1 is a schematic diagram for a panel of a computer case housing an exemplary heat dissipation system.

Referring again to FIG. 1, a speed instruction device 60 may be provided on the panel 50 to indicate the current relationship between the control element 40 and speed of the fan. The speed of the fan can be set to within 1200 to 2400 revolutions per minute (RPM).

The temperature sensitive color-changing material may be gel powder with particle size of 1 to 10 micrometers (μm). Accordingly, the original color of the temperature sensitive color-changing material fades to transparency with temperature increase to or beyond a predetermined value.

The material of the control element 40 may, for example, be blue color-changing material which changes color at temperature 33° C. combined with red color plastic material. The color changes based on the temperature, specifically, the control element 40 appearing blue when the temperature is below 29° C. and the blue fading as the temperature rises, becoming fully transparent when the temperature reaches 33° C. such that the control element 40 shows the red color of the plastic material. Temperature of an inner surface of the computer case is thus indicated automatically. Furthermore, the panel 50 can be fabricated of blue color material, with resulting color contrast between the control element 40 and the panel 50 so as to even more dramatically highlight the indication.

In other embodiments, the temperature sensitive color-changing material may be provided elsewhere on the panel 50 or other obvious location of the computer case, and is not limited to disposition on the control element 40. Additionally, the control element 40 is not limited to disposition on the panel 50.

Furthermore, the heat dissipation system may be used in other electronic devices such as notebooks and tower servers while remaining well within the scope of the disclosure.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A heat dissipation system for an electronic device, comprising:
   a base;
   a motor mounted on the base;
   a fan connected to the motor, speed of which is in a proportional relationship to an input voltage;
   a pulse width modulation speed control circuit capable of controlling the speed of the fan, receiving a pulse width modulation signal and outputting a voltage signal;
   a converter connected to a direct current power source, and capable of outputting a voltage signal, the converter comprising a regulator capable of regulating the voltage signal;
   a selection switch connected to the motor;
   a control element mounted on a surface of the base and connected to the switch and to the converter,
   wherein, when the control element is operated, the switch selectively enables the motor to receive output of the pulse width modulation speed control circuit or output of the converter, and when the motor is electrically connected to the converter, operation of the control element drives the regulator to modify the output voltage of the converter; and
   wherein, the control element is at least partially comprised of temperature sensitive color-changing material, the color of which differs from that of the control element's constituent material.

2. The heat dissipation system as claimed in claim 1, wherein the surface of the base is at least partially comprised of temperature sensitive color-changing material.

3. The heat dissipation system as claimed in claim 2, wherein the surface of the base appears as the first color when below a first temperature, with the first color of the temperature sensitive color changing material fading gradually as the temperature increases beyond the first temperature while remaining less than a second temperature, with the first color fading fully to transparency and the control element appearing as the second color of the constituent material when the temperature exceeds a second temperature.

4. The heat dissipation system as claimed in claim 1, wherein the electronic device is a computer system.

5. The heat dissipation system as claimed in claim 1, wherein the temperature sensitive color-changing material is a temperature sensitive color-changing gel powder, and wherein the color of the temperature sensitive color-changing gel powder begins to fade after passing a first temperature, and gradually fade until becoming transparent upon reaching a second temperature.

6. The heat dissipation system as claimed in claim 1, wherein the surface of the base has an opening defined therein for receiving the control element.

7. The heat dissipation system as claimed in claim 6, wherein an appearance of the control element is capable of indicating the relationship between the current control settings and the speed of the fan.

8. The heat dissipation system as claimed in claim 6, wherein the motor is electrically connected to the output of the converter when the control panel is at a first setting, and the motor is electrically connected to the output of the PWM control circuit when the control is at a second setting.

9. A computer system, comprising:
   a case;
   a heat dissipation system mounted on the case, comprising:
      a motor;
      a fan connected to the motor, speed of which is in a proportional relationship to an input voltage;
      a pulse width modulation speed control circuit capable of controlling the speed of the fan, receiving a pulse width modulation signal and outputting a voltage signal;
      a converter connected to a direct current power source, and capable of outputting a voltage signal, the converter comprising a regulator capable of regulating the voltage signal;
      a selection switch connected to the motor;
      a control element mounted on a surface of the case and connected to the switch and to the converter,
   wherein, when the control element is operated, the switch selectively enables the motor to receive output of the pulse width modulation speed control circuit or output of the converter, and when the motor is electrically connected to the converter, operation of the control element drives the regulator to modify the output voltage of the converter; and
   wherein, the control element is at least partially comprised of temperature sensitive color-changing material, the color of which differs from that of the control element's constituent material.

10. The computer system as claimed in claim 9, wherein the surface of the case is at least partially comprised of temperature sensitive color-changing material.

11. The computer system as claimed in claim 9, wherein the temperature sensitive color-changing material is a temperature sensitive color-changing gel powder, and wherein the color of the temperature sensitive color-changing gel powder begins to fade after passing a first temperature, and gradually fade until becoming transparent upon reaching a second temperature.

\* \* \* \* \*